United States Patent
Wang et al.

(10) Patent No.: US 8,639,454 B2
(45) Date of Patent: Jan. 28, 2014

(54) METHOD OF EFFICACY ANTICIPATION AND FAILURE EXAMINATION FOR AN APPARATUS

(75) Inventors: Chun-Chieh Wang, New Taipei (TW);
Yu-Liang Chung, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 300 days.

(21) Appl. No.: 13/043,700

(22) Filed: Mar. 9, 2011

(65) Prior Publication Data

US 2012/0144237 A1 Jun. 7, 2012

(30) Foreign Application Priority Data

Dec. 3, 2010 (TW) ............................... 99142047 A

(51) Int. Cl.
*G01B 3/44* (2006.01)
(52) U.S. Cl.
USPC ........................................................... 702/34
(58) Field of Classification Search
USPC ........................................................... 702/34
See application file for complete search history.

(56) References Cited

U.S. PATENT DOCUMENTS

| 2009/0257873 A1 | 10/2009 | Egedal et al. | |
| 2009/0281735 A1 * | 11/2009 | Bechhoefer | 702/34 |

FOREIGN PATENT DOCUMENTS

| JP | 2006-37850 | 2/2006 |
| JP | 2009167848 | 7/2009 |
| TW | I259546 B | 8/2006 |
| TW | I282850 | 6/2007 |
| TW | 200843316 | 11/2008 |
| TW | 201000754 | 1/2010 |
| WO | 2009027509 | 3/2009 |

OTHER PUBLICATIONS

Andrew Kusiak, Wenyan Li, Short-term prediction of wind power with a clustering approach, Renewable Energy, Mar. 27, 2010, pp. 2362-2369, Renewable Energy 35 (2010), Journal Elsevier.
Giuseppe Grassi, Pietro Vecchio, Commun Nonlinear Sci Numer Simulat, Oct. 5, 2009, pp. 2262-2266, Commun Nonlinear Sci Numer Simulat 15 (2010), Journal Elsevier.
T.S. No, J-E. Kim, J.H. Moon, S.J. Kim, Modeling, control, and simulation of dual rotor wind turbine generator system, Renewable Energy, Jan. 2009, pp. 2124-2132, Renewable Energy 34 (2009), Journal Elsevier.
TW Office Action Isuued on Jun. 17, 2013.
Taiwan Patent Office, "Notice of Allowance Issued", Oct. 16, 2013.

* cited by examiner

*Primary Examiner* — Stephen Cherry
(74) *Attorney, Agent, or Firm* — WAPT, PC; Justin King

(57) ABSTRACT

A method of efficacy anticipation and failure examination for an apparatus is disclosed. The method first establishes an anticipation model, and then trains the anticipation model by calibrating the same using errors obtained between a realistic data and an anticipated data, so as to use the calibrated anticipation model to estimate the performance efficacy of an apparatus or any component in the apparatus, and also to acknowledge if there is any abnormality occurred during the operation of the apparatus or the component.

10 Claims, 1 Drawing Sheet

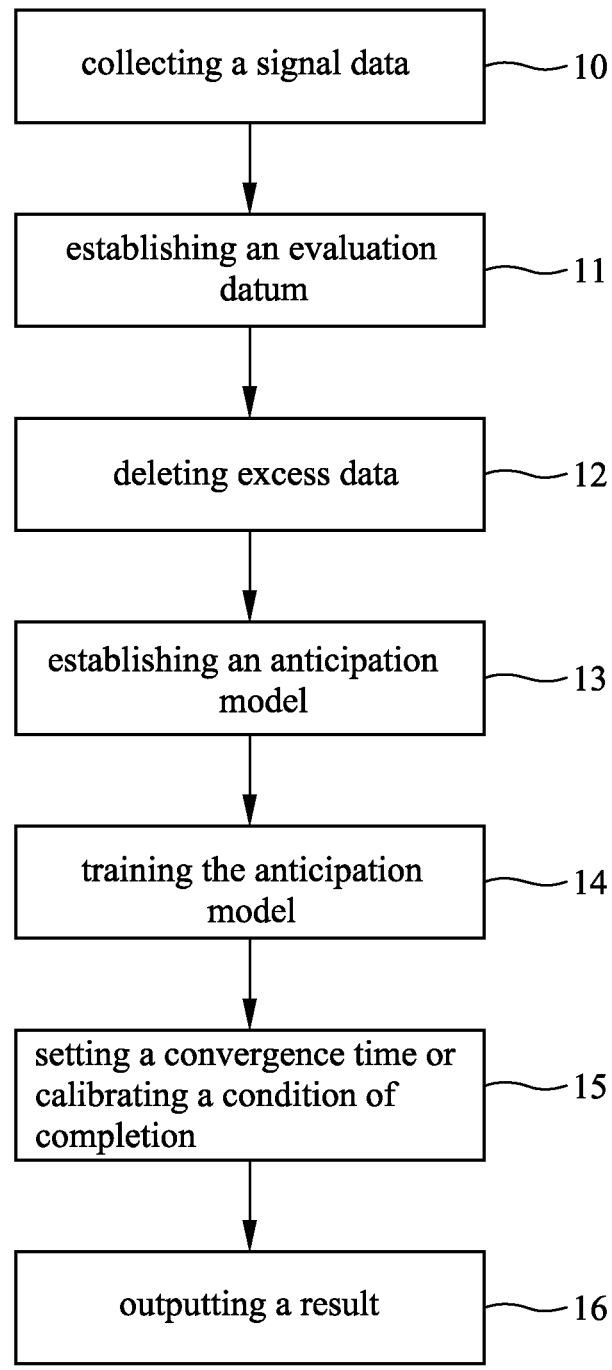

METHOD OF EFFICACY ANTICIPATION AND FAILURE EXAMINATION FOR AN APPARATUS

TECHNICAL FIELD

The present disclosure relates to a method of efficiency anticipation and failure examination for an apparatus, and more particularly, to a method capable of using an anticipation model to estimate the efficiency of an apparatus and simultaneously to detect if there is any abnormality occurred during the operation of the apparatus.

TECHNICAL BACKGROUND

With the increasing attention toward the global climate change and environmental consciousness, green energy, such as solar power, wind power, wave power, geothermal power, hydrogen energy or biomass energy, is becoming a focal point for industries all over the world since it can be extracted, generated, and/or consumed without any significant negative impact to the environment. Among which, wind power is the one most likely to become the alternative energy source of the future since its development had exceeded others.

It is noted that wind turbine is the device most commonly used today for harnessing and converting wind power into electricity, Nevertheless, while operating under spatially and temporally heterogeneous and unstable wind field, not only the wind turbine might not be able to produce electricity in direct proportion with the wind speed and the amount of wind being received thereby, but also the sudden disruption of violent gusts may cause damages to the key components of the wind turbine, such as the gear box and generator. Thus, it is important to be able to predict and estimate the efficiency as well as the lifespan of the wind turbines so as to optimize its performance.

There are two types of lifespan estimation method that are most often used, which are a theoretical lifespan analysis and estimation for key components of wind turbines; and a machinery state-of-health evaluation and identification based upon the experience of field maintenance staff or experts.

In the theoretical lifespan analysis and estimation method, the lifespan of any key component is estimated and anticipated using a calculation based upon a service life expectancy evaluation relating to the material of the key component. Nevertheless, in order to obtain such theoretical maximum service life estimation for the key component, such as gears and bearings, the calculation is mostly based upon how good the ability of the material that is used to make the key component can resist fatigue failure. Therefore, it is required to have a plurality of basic parameters, such as material characteristics, operation modes or working environment, to be defined before the calculation for obtaining such theoretical maximum service life can be performed. However, any error in the definition of any such basic parameter can severely affect the accuracy of the resulting theoretical maximum service life estimation. Moreover, since the environment parameters for characterizing an actual working environment are generally are non-linearly distributed, the definitions of such environment parameters can be very difficult to obtain.

In the machinery state-of-health evaluation and identification based upon the experience of field maintenance staff or experts, since the machinery used in the field can vary with the change of working environment and the field maintenance staff can performed the estimation only based upon their own working experience and the current working status of the machinery, the accuracy of the estimation is severely dependent upon how experienced the field maintenance staff is.

To sum up, as one of the two most commonly used methods for efficiency and service life estimation can only be performed after a plurality of basic parameters are obtained and defined exactly corresponding to the actual working environment, but that can be a very difficult task, while the accuracy of another method is solely depending upon the experience of its field maintenance staff, not only the accuracy is in question, but also the procedures for performing of the aforesaid methods can not be standardized as they can be heavily depending on individual experience. Thus, there still are much to be improved in the aforesaid efficiency and service life estimation methods.

TECHNICAL SUMMARY

The object of the present disclosure is to provide a method of efficacy anticipation and failure examination for an apparatus, in which first an anticipation model is established based upon a realistic input data and a realistic output data relating to an apparatus or one component of the apparatus, and then the anticipation model is trained and calibrated using errors obtained between the realistic output data and an anticipated output data, so that the calibrated anticipation model can be used in an operation of efficacy anticipation and failure examination.

To achieve the above object, the present invention provides a method of efficacy anticipation and failure examination, which comprises the steps of:

(1) collecting signal data: collecting a realistic input data and a realistic output data from an apparatus or a component of the apparatus;
(2) establishing an evaluation datum;
(3) establishing an anticipation model: defining and setting parameters to be used for establishing an anticipation model;
(4) training the anticipation model: inputting the realistic input data and the realistic output data into the anticipation model for training the anticipation model;
(5) setting a convergence time to be defined as the operation time of the anticipation model;
(6) outputting an estimation resulting from the operation of the anticipation model: inputting the realistic output data into the anticipation model so as to obtain an estimation value, and then comparing the estimation value with the evaluation datum for obtaining an estimation of efficacy anticipation and failure examination.

In the aforesaid step (1), the format of the realistic input data, being a physical quality, is a signal average obtained within a specific period of time; and when the realistic input data is a continuing signal, a stochastic parameter estimation is performed using the continuous signal for obtaining a parameter, and the parameter can be a parameter selected from the group consisting of: the average, the standard deviation and the variance of the stochastic parameter estimation, whichever capable of representing the continuous signal.

In the aforesaid step (2), the evaluation datum is calculated and obtained based upon the relationship between a performance curve and a curve of historical data.

Moreover, the method of the present disclosure further comprises a step for deleting excess data that is performed after the step (2) and prior to the step (3), and is substantially a dimension reduction process being performed when the volume of data containing in the realistic input data of step (1) is being determined to be too large, whereas the dimension reduction process is an analysis selected from the group consisting of: the principal component analysis (PCA) and the linear discriminant analysis (LDA).

In the aforesaid step (3), the parameters being defined includes an initial error, a learning speed and a convergence error; and the anticipation model is established using a means selected from the group consisting of: an artificial neural network means, an auto-regressive model, and a logistic regression means.

In the aforesaid step (5), a process for selectively calibrating a condition of completion is performed, which comprises the steps of: calculating an error value between a realistic data and an anticipated data; proceeding to the step (6) when the error is smaller than a predefined error value; and calibrating the anticipation model while proceeding back to the step (4) when the error is larger than the predefined error value.

To sum up, the method of efficacy anticipation and failure examination of the present disclosure has the following advantages:

(1) In an embodiment that when the apparatus is a wind turbine and the component is a gear box, a spindle or the generator of the wind turbine, the performance efficiency of the apparatus or the component as well as any abnormality occurred during the operation of the apparatus or the component can be estimated and anticipated by the anticipation model according to the comparison between the realistic output data and the calculation result of the anticipation model.

(2) As the method of the present disclosure can be applied for inspecting the operation of the whole apparatus or for inspecting the operation of any single component in the apparatus, the adverse affect caused by those external uncertainty factor can be minimized and this the accuracy of the estimation achieved by the method of the present disclosure is increased.

(3) In addition to performance efficiency estimation, the method of the present disclosure can also predict the occurrence of damage, that is, any abnormality occurred during the operation of the apparatus or the component can be estimated and anticipated by the anticipation model according to the comparison between the realistic output data and the calculation result of the anticipation model.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIG. 1 is a flow chart showing the steps performed in a method of efficacy anticipation and failure examination according to the present disclosure.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Please refer to FIG. 1, which is a flow chart showing the steps performed in a method of efficacy anticipation and failure examination according to the present disclosure. As shown in FIG. 1, the method of efficacy anticipation and failure examination comprises the following steps:

(1) collecting a signal data 10: collecting a realistic input data and a realistic output data from an apparatus or a component of the apparatus. For instance, when the apparatus is substantially a wind turbine, the realistic input data can be the rotation speed, the wind speed or the wind direction, and the realistic output data can be the electricity generating capacity. Moreover, there can be two format types of the realistic input data, and one of which is a signal average obtained within a specific period of time, representing a physical quality; and the other is used when the realistic input data is a continuing signal, whereas the continuous signal is used in a stochastic parameter estimation for obtaining a parameter, and the parameter can be a parameter selected from the group consisting of: the average, the standard deviation and the variance of the stochastic parameter estimation, whichever capable of representing the continuous signal. In addition, when the apparatus is substantially a wind turbine, the abovementioned component can be its gearbox, spindle, or generator. If the component is substantially a gearbox, the realistic input data can be the rotation speed, and the realistic output data can be the noise. Accordingly, since the variation in noise level can be predicted through the variation in rotation speed, such prediction can be applied as the result of the efficacy anticipation and failure examination method of the present disclosure.

(2) establishing an evaluation datum 11: the evaluation datum is calculated and obtained based upon the relationship between a performance curve and a curve of historical data. Taking the aforesaid wind turbine for example, its evaluation datum for a common wind turbine can be ranged between 0~1 according to its performance curve and curve of historical data.

(3) deleting excess data 12: such data deletion step is substantially a dimension reduction process being performed when the volume of data containing in the realistic input data of step (1) is being determined to be too large so as to minimizing the time required for model establishment, whereas the dimension reduction process performed in the data deletion step is an analysis process selected from the group consisting of: the principal component analysis (PCA) and the linear discriminant analysis (LDA).

(4) establishing an anticipation model 13: defining and setting parameters to be used for establishing an anticipation model, whereas the anticipation model is established using a means selected from the group consisting of: an artificial neural network means, an auto-regressive model, and a logistic regression means, and according to that the parameters being used for establishing the anticipation model can include an initial error, a learning speed and a convergence error.

(5) training the anticipation model 14: inputting the realistic input data and the realistic output data into the anticipation model for training the anticipation model.

(6) setting a convergence time or calibrating a condition of completion 15: in this step, a convergence time is set, whereas such convergence time is the predicted operation period of the anticipation model, or an error is calculated between a realistic data and an anticipated data, by that the method will proceed to the next step when the error is smaller than a predefined error value; or the method will perform an operation for calibrating the anticipation model and then proceed back to the step (5) when the error is larger than the predefined error value. Taking the aforesaid wind turbine for instance, the error is substantially the difference between the electricity generating capacity that is actually measured from the wind turbine and the predicted electricity generating capacity of the wind turbine.

(7) outputting a result 16: inputting the realistic output data into the anticipation model so as to obtain an estimation value, and then comparing the estimation value with the evaluation datum for obtaining an estimation of efficacy anticipation and failure examination.

To sum up, the method of the present disclosure first establish an anticipation model, and then use the anticipation model to calculate and obtain an estimation value, whereas the estimation value is substantially a prediction that can be compared with an evaluation datum of the apparatus or with a realistic output data measured from the apparatus so as to estimate the performance efficacy of an apparatus or any component in the apparatus, and also to acknowledge if there is any abnormality occurred during the operation of the apparatus or the component.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A method of efficacy anticipation and failure examination for a wind turbine, comprising the steps of:
   (1) collecting signal data: collecting a realistic input data and a realistic output data from an apparatus or a component of the apparatus;
   (2) establishing an evaluation datum;
   (3) deleting excess data that is substantially a dimension reduction process being performed when the volume of data containing in the realistic input data of step (1) is being determined to be too large;
   (4) establishing an anticipation model: defining and setting parameters to be used for establishing an anticipation model;
   (5) training the anticipation model: inputting the realistic input data and the realistic output data into the anticipation model for training the anticipation model;
   (6) setting a convergence time, by a computer to be defined as the operation time of the anticipation model, performing a process for selectively calibrating a condition of completion, which calculates an error value between a realistic data and an anticipated data, and if the error is smaller than a predefined error value, then proceeding to the step (7), if the error is larger than the predefined error value then proceeding to the step (5) and calibrating the anticipation model; and
   (7) outputting an estimation resulting from the operation of the anticipation model: inputting the realistic output data into the anticipation model so as to obtain an estimation value, and then comparing the estimation value with the evaluation datum for obtaining an estimation of efficacy anticipation and failure examination.

2. The method of claim 1, wherein in the step (1), the format of the realistic input data is a signal average obtained within a specific period of time, representing a physical quality.

3. The method of claim 2, wherein the evaluation datum is calculated and obtained based upon the relationship between a performance curve and a curve of historical data.

4. The method of claim 1, wherein when the realistic input data is a continuing signal, a stochastic parameter estimation is performed using the continuous signal for obtaining a parameter, and the parameter can be a parameter selected from the group consisting of: the average, the standard deviation and the variance of the stochastic parameter estimation, whichever capable of representing the continuous signal.

5. The method of claim 4, wherein the evaluation datum is calculated and obtained based upon the relationship between a performance curve and a curve of historical data.

6. The method of claim 1, wherein the evaluation datum is calculated and obtained based upon the relationship between a performance curve and a curve of historical data.

7. The method of claim 6, wherein, the dimension reduction process performed in the data deletion step is an analysis process selected from the group consisting of: the principal component analysis (PCA) and the linear discriminant analysis (LDA).

8. The method of claim 7, wherein in the step (4), the parameters being defined includes an initial error, a learning speed and a convergence error; and the anticipation model is established using a means selected from the group consisting of: an artificial neural network means, an auto-regressive model, and a logistic regression means.

9. The method of claim 8, wherein the apparatus is a wind turbine.

10. The method of claim 8, wherein the component is a part selected from the group consisting of: a gear box, a spindle and a generator.

* * * * *